(12) United States Patent
Turnwald et al.

(10) Patent No.: US 10,493,950 B2
(45) Date of Patent: Dec. 3, 2019

(54) APPARATUS AND METHOD FOR DETECTING A PROPER APPLICATION OF A SEAT BELT IN A VEHICLE

(71) Applicant: AUDI AG, Ingolstadt (DE)

(72) Inventors: Maximilian Turnwald, Ingolstadt (DE); Christian Ewald, Ingolstadt (DE); Matthias Kosik, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 73 days.

(21) Appl. No.: 15/717,122

(22) Filed: Sep. 27, 2017

(65) Prior Publication Data
US 2018/0126949 A1 May 10, 2018

(30) Foreign Application Priority Data
Nov. 8, 2016 (DE) .................... 10 2016 121 341

(51) Int. Cl.
| | | |
|---|---|---|
| *G01G 19/414* | (2006.01) | |
| *B60N 2/28* | (2006.01) | |
| *B60R 21/015* | (2006.01) | |
| *B60R 22/48* | (2006.01) | |
| *B60N 2/22* | (2006.01) | |

(52) U.S. Cl.
CPC ............. *B60R 22/48* (2013.01); *B60N 2/22* (2013.01); *B60R 2022/4825* (2013.01); *B60R 2022/4841* (2013.01); *B60R 2022/4858* (2013.01)

(58) Field of Classification Search
CPC ............ B60R 22/48; B60R 2022/4841; B60R 2022/4825; B60R 2022/4858; B60R 22/1955; B60R 21/01516; B60R 21/0156; B60R 2022/282; B60R 2022/4661; B60R 22/28; B60R 21/01558; B60R 2022/288; B60R 2022/4685; B60R 21/0152; B60R 21/01546; B60R 21/01556;
(Continued)

(56) References Cited

U.S. PATENT DOCUMENTS

| | | | | |
|---|---|---|---|---|
| 6,069,325 A | * | 5/2000 | Aoki | ................ B60N 2/002 177/136 |
| 6,259,042 B1 | * | 7/2001 | David | ................ G01G 19/4142 177/136 |

(Continued)

FOREIGN PATENT DOCUMENTS

| | | |
|---|---|---|
| CN | 204196844 U | 3/2015 |
| DE | 102010023491 A1 | 1/2011 |

*Primary Examiner* — Lisa M Caputo
*Assistant Examiner* — Brandi N Hopkins
(74) *Attorney, Agent, or Firm* — Maier & Maier, PLLC (57) ABSTRACT

An apparatus for proper application of a seat belt in a vehicle. The apparatus includes the seat belt and a seat belt buckle which is assigned to it and which is provided with a measuring device, arranged for measuring a tensile force exerted on the seat belt buckle. The apparatus further relates to an evaluation device for evaluating the measured tensile force. At the same time, it is provided that the apparatus is also equipped with a tightening device for applying a tightening force to the seat belt, as well as with a detection device for detecting the applied tightening force. The evaluation device compares the tensile force to the tightening force and determines based on a corresponding comparison result whether the seat belt has been properly placed and secured in the seat belt buckle.

14 Claims, 3 Drawing Sheets

(58) Field of Classification Search
CPC ............................ B60R 21/0155; B60N 2/22;
B60N 2002/281; G01G 19/4142
See application file for complete search history.

(56) References Cited

U.S. PATENT DOCUMENTS

| | | | |
|---|---|---|---|
| 6,767,031 B2 | 7/2004 | Yamamoto | |
| 7,128,343 B2* | 10/2006 | Ingemarsson | B60R 21/0134 280/805 |
| 7,140,641 B2* | 11/2006 | Ingemarsson | B60R 21/0134 280/805 |
| 2003/0033885 A1* | 2/2003 | Knox | B60N 2/002 73/777 |
| 2006/0290130 A1* | 12/2006 | Hall | B60R 21/01546 280/801.1 |

* cited by examiner

APPARATUS AND METHOD FOR DETECTING A PROPER APPLICATION OF A SEAT BELT IN A VEHICLE

FIELD

The invention relates to an apparatus for detecting a proper application of a seat belt in a vehicle, a correspondingly equipped vehicle, as well as a method.

BACKGROUND

In current vehicles, seat belts or safety belts are an indispensable means guaranteeing the safety of the occupant. It is in this case it is very common to check by means of a pressure switch, which is provided in a belt buckle and intended to secure the seat belt, whether the seat belt is properly applied as intended, or locked in. However, this mechanism is easily circumvented, for example with blind belt buckles, or with locking tongues, but also with improper guiding or progression of the seat belt—for example behind a vehicle seat. This not only makes it possible to easily undermine legal regulation, but it also endangers the safety of the vehicle occupants.

From CN 204196844 U is known a warning device by means of which a correct carrying or placement of the seat belt as well as corresponding bypassing attempts are detected and a warning is to be generated when required.

For this purpose, sensors are used which are arranged in a belt buckle for detecting a vertical and a horizontal component of a tension or force acting on the belt buckle and which are compared to predetermined values.

The document DE 10 2010 023 491 A1 discloses a buckle application detecting device for a seat belt whose purpose is to detect with reliability whether an occupant of a vehicle has buckled up a seat belt. For this purpose, the closed state of a belt buckle, the extraction of a belt buckle or the length of the extension of the seat belt can be detected by respective sensors, and also the tightening of the force that is applied to tighten a seat belt can be detected. With a corresponding evaluation and comparison to typical values or reference values, it can then be inferred whether the occupant is buckled in as intended.

The document U.S. Pat. No. 6,767,031 B2 discloses a device and a method for controlling a seat belt wherein the wearing status of the seat belt is detected by a corresponding sensor and the belt is motorized so that it can be rolled up and unrolled. In addition, one sensor is provided for determining the tension or the tensile force of the belt. This is compared to a specified value in order to determine whether the belt is being worn by the passenger.

SUMMARY OF THE DISCLOSURE

The objective of the present invention is to enable a particularly reliable detection of a proper application of a seat belt as intended in order to increase the safety of an occupant.

This objective is achieved with an apparatus, a vehicle, and a method having the features of the independent patent claims. Advantageous embodiments of the invention are described in the following description, as well as in the dependent patent claims.

The apparatus according to the invention for detecting a proper application of a seat belt as intended in a vehicle comprises a seat belt and a seat belt buckle associated with the seat belt, in which is arranged a measuring device for measuring the tensile force exerted on the seat belt buckle.

Further, the apparatus comprises an evaluation device for evaluating the measured tensile force. In order to enable a particularly reliable detection as to whether the seat belt is attached as intended, it is provided according to the invention that the apparatus is equipped with a tightening device for exerting a tightening force on the seat belt as well as with a corresponding detection device for detecting the applied tightening force. Further, it is provided that the evaluation device is configured to compare the tensile force to the tightening force and to determine based on a corresponding comparison result whether the seat belt is secured in the belt buckle in accordance with the intended purpose. An assignment existing between the seat belt and the belt buckle in this case means that the belt buckle is arranged to be received as intended, for example as provided by the manufacturer of the vehicle, precisely and securely in the seat belt. In this case, there is a mutual and unambiguous assignment of the arrangement of a specific seat belt and a specific seat belt buckle. In particular, the seat belt buckle and/or the seat belt can be arranged on or next to a passenger seat or a seat equipment of the vehicle and designed and configured to secure an occupant of the vehicle precisely in this seat or the seat system. When the seat belt is applied as intended by the vehicle or by the passenger, this ensures that the seat belt will be held in the seat or in the seat equipment during the accelerating operations of the vehicle.

BRIEF DESCRIPTION OF THE DRAWINGS

Embodiments of the invention will be explained next with reference to schematic illustrations, which show the following.

DETAILED DESCRIPTION

Unless specified otherwise, the term "detection" relates to detection or recognition of the determination of whether the seat belt is securely held in the belt buckle that is assigned to it.

The tightening device can exert a tightening force on the seat belt, for example by means of a spring element, a torsion spring, or an electric motor. The tensile force applied to the seat belt buckle can be exerted in particular completely or partially by the by the seat occupant, or it can be applied with a tightening device. However, other sources and causes of tensile force may be also employed, such as for example movements or acceleration processes of the vehicle, or influences of other vehicle occupants and/or the influence of baggage carried in the vehicle on the seat belt and/or on the belt buckle. When such additional sources, causes or influences are taken into account, this can possibly also improve the detection. However, it is also possible to obtain clear evidence as to whether the seat belt is secured in accordance with the intended purpose, i.e. whether it is secured in the belt buckle assigned to it, from an evaluation or from a a comparison of the measured tensile force with the measured tightening force. To achieve securing in this manner, for example a belt tongue of the seat belt can be inserted into the belt buckle and locked or fixed therein, for which purpose the belt buckle can be provided for example with a releasable locking mechanism.

For example, a situation can arise when the tightening force applied by means of the tightening device is greater than the tensile force measured on the belt buckle. This may be an indication that the seat belt is not placed as intended, or at least not in the intended manner, in particular when the difference between the measured tensile for and the tightening force exerted by the tightening device is greater than the specified tolerance, or a specified threshold or limiting value. So for example, the seat belt can be in these situation held manually by the seat occupant away from his body. However, although the seat belt would be secured in the belt buckle assigned to it, based on the comparison of the tensile force to the tightening force, or based on the amount of the difference between these forces, it could be detected that the seat belt is not guided or arranged uninfluenced and as intended. In this case, the tolerance or the threshold value for the difference or deviation between the tensile force and the tightening force can be predetermined so that the a faulty application, i.e. unintended application of the seat belt will be detected only when the threshold value is exceeded. It is also possible to store for example in a storage device of the evaluation device at least one predetermined value of the difference between the tensile force and the tightening force, which is to say that the comparison result is stored or retained, and a specified meaning and/or instruction is assigned to it. It is also possible to store or preserve in the storage device also for example a corresponding characteristic curve and assignment rule or the like. Based on the predetermined value of the specified characteristic curve or of the specified assignment rule, a corresponding meaning can be assigned by means of the evaluation device to the comparison result and it can thus be determined whether the seat belt is applied as intended or not. In another situation, for example the force exerted on the seat belt by means of the tightening device can be equal to the measured tensile force. If the tightening device is for example arranged in this case on the opposite side of the seat facing away from it, this can be also an indication of a improper placement of the seat belt, because in such a case the friction effects a deviation between the friction effect of the seat belt and the seat occupant, and between the applied tightening force and the measured tensile force, which should be expected.

Generally, the device according to the invention makes it possible to determine with particular reliability whether the seat belt has been placed as intended and whether the passenger in the seat has thus been correctly and properly secured with the belt. In contrast to conventional apparatuses or methods, this cannot be circumvented, at least not with easily available means. The required devices and components can be in this case advantageously integrated in components that are customary or that are already provided, such as for example the seat belt buckle and/or a B or C pillar of the vehicle into which the seat belt can be at least partially stored or rolled up. Therefore, additionally safety can thus be provided for the vehicle occupants in an advantageous manner without placing restrictions on the design, or without placing restrictions on the available internal space of the vehicle, or without requiring handling of the seat belt that is contrary to conventional systems.

It can be also provided that depending on the evaluation result of the evaluation device, or depending on the result of a determination or recognition whether the seat belt is placed as intended, at least one other function or action can be triggered or initiated. So for example, a corresponding warning message or a corresponding warning signal can be output in the event of a faulty or improper application of the seat belt. It is also possible that a specified function or functionality is activated or released only when a proper application of the seat belt has been detected. This can be an advantageous option to encourage or motivate the occupants of the vehicle or of the seats to apply the seat belt as intended. This can lead to an advantageous improvement of the security or to increased security and thus also to safe traffic conditions.

In a further embodiment of the present invention it is provided that the tightening device comprises an actuator system that is arranged in a pull-out area from which the seat belt can be pulled out and/or with an actuator system that is arranged in the seat belt buckle. The pull-out area can be for example a cavity in the B or C pillar of the vehicle, in which the seat belt is arranged at least partially, or where it is or can be kept when it is not used. The seat belt can be at least partially wound up or rolled up here. The actuator system can comprise for example a belt tensioner, in particular a reversible belt tensioner. If the belt tensioning device is arranged in the pull-out area, the tightening force can act directly on the seat belt, or it can be engaged by the seat belt buckle and act in the direction of its longitudinal extension along the seat belt away from the seat belt buckle. With an alternatively possible arrangement of the tightening device in or on the belt buckle, the tightening force can act in or on the seat belt buckle in a direction away from the pull-out area. In this case, it can be for example provided that the seat belt buckle can also become a pulling or force-extending component. In this manner, it can be advantageous in vehicles, or with seat belts which are not equipped with a reversible seat belt tightening device, when the detection is carried out in accordance with the present invention. However, an additional seat belt winding up device, for example a spring-loaded belt retractor, can be provided also in this case. The components that apply or can apply the tightening can be construction-related and known.

It is preferred when the tightening device can be used not only in dangerous situations or accidents, which is to say that the seat belt is tightened, but when the tightening force can be applied to the seat belt at any time or permanently. It is particularly preferred when the tightening force can be regulated or adjusted as required. In any case, the actuator system makes it possible to ensure active tightening of the seat belt, wherein not only an application of the seat belt that is arranged close to the body is guaranteed, but when also a measured variable is available and can be used to recognize the intended application of the seatbelt.

In another embodiment of the present invention it is provided that the seat belt is assigned to a seat of the vehicle and the evaluation device is configured to determine based on a result of a comparison whether the seat belt is guided behind a backrest of the seat. A guided longitudinal arrangement of the seat belts behind the backrest part of the seat in this case means that the seat belt is arranged on a side of the backrest or of the seat facing away from the seat occupant, so that it cannot exert any restraining effect on the seat occupant, or at least not the intended restraining effect. In a corresponding manner, it can be also determined by means of the evaluation device whether the seat belt is arranged so that it is guided for example under a seat part of a cushion part of the seat. In a similar situation, the seat belt can be inserted into a seat belt buckle associated with it, and the corresponding tightening force exerted on it can be correlated in a consistent manner to the tensile force measured on the seat belt buckle. However, the actual tightening forces and/or tensile forces that are actually occurring will differ due to the mutually different or deviating progression of the seat belt, which is different from the intended purpose. Therefore, it can be determined—for example also by means of a characteristic curve—in which position, or status, or arrangement the seat belt is guided or located. The characteristic curve can be for example preset by the manufacturer and it can be stored in a storage device of the evaluation device.

The corresponding values of the characteristic curve or the values of a table can be determined for example under known conditions for a plurality of different situations or parameters. On the whole, a particularly advantageous and particularly simple or obvious possible way for the seat occupant to circumvent conventional devices and methods for recognizing the proper application of the seat belt as intended is thus accounted for. Therefore, the intended application can be recognized very reliably and the safety of the occupant can thus be improved.

In another embodiment of the invention it is provided that seat belt is assigned to a seat of the vehicle and the evaluation device is configured to determine based on a result of a comparison whether the seat belt is guided between the respective seat occupant and the seat. This can be carried in a manner that is analogous to the described determination, namely for determining whether the seat belt is arranged so that it is guided behind the backrest of the seat. Accordingly, a description of a characteristic curve, which takes into account for example this situation or the like, can be also provided. Advantageous can be therefore also a situation in which it is detected that although the seat belt is secured in the seat belt buckle that is assigned to it, it is not placed as intended, wherein the safety of the seat occupant can be further improved. Also, when the seat belt is guided or arranged between the seat occupant, in particular between the back of the seat occupant and the seat, the seat belt cannot exert any restraining effect on the seat occupant.

In another embodiment of the present invention it is provided that the apparatus is configured to carry out the determination before or at the beginning of each trip of the vehicle and/or at each locking of the seat belt buckle. The beginning of a trip can be defined for example as starting a driving engine of the vehicle, or as setting the vehicle in motion. It can therefore be advantageous when the safety of the seat occupant during the setting of the vehicle in motion is ensured without having to bother the occupant or occupants of the vehicle with unnecessary warnings, for example when the vehicle is at a standstill, and for example only the ignition is activated.

A check of the correct application or application of the seat belt with each locking of the seat belt buckle makes it advantageously possible to detect or monitor, for example when the occupant's seat is changed and/or during a temporary releasing of the seat belt, in particular also during the course of the trip, whether the seat belt has been placed correctly and as intended. The seat occupant thus advantageously does not necessarily have to rely during the trip on a single check only. Consequently, the intended application of the seat belt by the seat occupant cannot be circumvented for example so that the seat belt is applied correctly only for a limited period of time during the respective trip, or only at a specific point in time and then released and for example replaced by inserting a dummy into the seat belt buckle. A dummy may not be even for example connected to a single belt or a locking tongue.

In another embodiment of the invention it is provided that the device comprises an extension sensor to determine the length of the extension of the seat belt and the evaluation device is adapted to take into account during the detection by the respective extension sensor also the current extension length. The extension length in this case shows how far the seat belt has been extended, unwound or unrolled from a belt retractor or the like. A further parameter is thus advantageously made available, by means of which an application state or positional status of the seat belt can be taken into consideration or evaluated, which indicates whether the seat belt is placed as intended or incorrectly. In this case it is also possible to take into account the speed of the withdrawal of the seat belt and/or the force that has been applied for this purpose. The current situation can be determined or arranged even better while taking into consideration additionally also other values and data and the application status of the seat belt can thus be determined in an even more reliable manner. In this sense it is particularly advantageous that a temporal progression of the length of the withdrawal can be detected, taken into account and evaluated. Also in this case it is possible to preset one or a plurality of values, ranges of value or a corresponding characteristic curve.

It is possible for example to define a minimum length of the withdrawal, below which it may not be possible for the seat belt to be secured in the seat belt buckle as intended. Therefore, in combination with the determined forces—or also independently of these forces—the application status can be determined at least in certain situation based on the withdrawn length. In another situation, the determined withdrawn length may be above a specified value, wherein the determined tightening value deviates from the measured tensile force. It can be determined from this that the seat belt is not applied tightly to the seat occupant and that it is for example caught or fixed on a piece arranged between the seat belt buckle and the withdrawal region. Even in this case, a permanent maximum withdrawn length cannot be considered as an indication of an unintended progress of the seat belt operation. In this case, the seat belt could be for example guided at a distance from the seat occupant that is too great, so that an optimal safety and restraining effect cannot be achieved—for example because in the event of an impact, the distance of the seat belt and thus of the seat occupant for example from the steering wheel of the vehicle cannot be maintained or guaranteed.

In another embodiment of the present invention it is provided that the evaluation device is adapted to take into account data or other information that is detected by at least one sensor system. This data may include at least a position of the seat to which the seat belt is assigned and/or an inclination of the backrest of the seat and/or an occupancy status of the seat or at least of one seat of the vehicle and/or a weight of a vehicle occupant who is using the seat belt and/or is sitting in the seat, and/or a body weight or a body mass, for example a body circumference of the seat occupant, which is to say of the occupant of the vehicle who is using the seat belt. One or a plurality of any combinations of such data or information can be taken into account—for example depending for example on the equipment of the vehicle.

The position of the seat can be in this case show so as to indicate where the respective seat is arranged in the vehicle, for example relative to a fixed component or an operating element located in the vehicle, for example relative to a window, or relative to a door opening of the vehicle.

Depending on the position or on the arrangement of the seat, for example different movements or movement directions of the respective seat occupant may be typical and therefore they can influence in a characteristic manner for example the tightening force and/or the tensile force. Similarly, external influences such as for example a movement or an acceleration of the vehicle may have a different effect, depending on where the seat is arranged in the vehicle. In particular, there can be different seat types. For instance, it is possible to take into account whether the seat is a driver's seat, a passenger seat (of a passenger sitting next to the driver), or another passenger's seat.

However, the position of the seat can be also additionally or alternatively related to a position or a setting of the respective seat with respect to a selectable or modifiable adjustment of the seat that is selected by the seat occupant, or with respect to the sitting position in the longitudinal direction of the vehicle, in the transverse direction of the vehicle and/or in the height direction of the vehicle. This can be particularly advantageously taken into account when it is recognized that at least one part of the apparatus according to the invention and/or of the seat belts is determined in a fixed manner for example relative to the frame of the vehicle. For example, the belt retractor can be arranged in or on the B pillar or the C pillar of the vehicle and its position can thus change relative to the seat with a position change of the seat. A change of the expected extension length is thus directly accompanied by a change in the expected withdrawal length in the case of a specific application of the seat belt. As a result of the modified geometry, however, the tensile forces exerted can also change in a characteristic manner. Accordingly, the same applies also to an inclination or to an adjustment of the inclination of the backrest part of the seat.

The occupancy status of the seat can in particular specify or describe whether the seat is free, which is to say unassigned or unoccupied, or whether it is occupied by a person. It is preferred when it can be also detected by a corresponding sensor system whether instead of being occupied by a person, the seat is occupied by or loaded with an object or a piece of baggage is placed on it. In any case, the occupancy status supplies a particularly valuable context for the recognition of the proper application of the seat belt as intended.

It can be advantageous when for example the determination of the occupancy status is carried out also prior to a potential detailed evaluation of the various forces. As a result, a potentially detailed evaluation can be avoided when it is recognized that the seat is not occupied by a person. However, it is also possible, in particular when the vehicle has several seats, to take into account also the respective forces acting on a seat belt and/or on a seat belt buckle of a seat unoccupied by a person on which no object has been placed. This can be advantageously used for example to enable a more precise determination of the actual situation, wherein for example more detailed warning messages and/or instructions can be output for the respective occupant of the vehicle seat. The weight of the respective occupant of a seat can have a direct effect on the forces exerted on the seat belt and/or on the seat belt buckle. This can be in particular the case with acceleration processes of the vehicle. The weight of the occupant of the vehicle thus represents an input variable that is suitable for a more precise and more reliable evaluation of the application status of the seat belt.

The body size and/or another body dimension, such as for example the body circumference of occupant of the seat, can also have an influence on the progress of the application of the seat belt even with a proper application as intended. By taking into account these factors and thus also the correspondingly changed expected progression, it is possible to take into account modified friction forces between the seat belt and the seat occupant, or their influences on the measured or determined forces. Similarly, the expected extension length of the seat belt can be also influenced by the body size or by the body mass.

By taking into account one or several parameters, the overall accuracy and reliability of the detection, as to whether the seat belt is applied correctly and as intended or improperly, can be improved. Also in this case, respective characteristic curves and the like can be communicated or determined under known conditions for respective parameters, so that on the basis of thereof a plurality of devices and/or parameter values of the vehicles can be evaluated according to the invention.

In another embodiment of the invention it is provided that the evaluation device is adapted to take into account a chronological sequence of several events detected by means of at least one sensor system. This makes it possible to detect in a particularly advantageous manner, for example also with an application or with the placement as intended, consistent values of the determined values of a manipulation that was carried out, or of an attempt at circumvention of the application as intended, or of buckling up operation. It may be possible that the seat belt is permanently fixed or secured in the seat belt buckle, but it is not applied or used as intended. In such a case it could be that for example after unlocking the vehicle, a tightening force and/or tensile force could be detected or is detected at the seat belt buckle with an extension length deviating from the rest position of the seat belt buckle with a seat belt buckle unlocking or locking event in a predetermined time interval, either beforehand or afterward. Therefore, it is not possible to draw a direct conclusion from this as to whether the seat belt has been applied and closed as intended.

In another embodiment of the present invention it is provided that the evaluation device is adapted to detect a temporal progression of the tensile force and/or of the tightening force and to take them into account based upon the detection. In other words it can be provided that the respective measured values of the tensile force are detected regularly or continuously and for example recorder in a storage device. It can be also provided that the evaluation is carried out in real time, so that not all the resulting measures and row data need to be stored. Events that are detected and evaluated with respect to their chronological order can be taken into account for example to be employed for a wide variety of switching or operating processes or functional solutions or operating states or changes of the operating states of the vehicle and/or of individual functions or functionalities of the vehicle. It is particularly preferred when all the events can be arranged so as to include at least one load or occupancy of the seat to which the seat belt is arranged, one withdrawal of the seat belt, and one locking or engaging of the seat belt buckle. These events are advantageously directly relevant to the determination of the correct application of the seat belt. If these events occur in a sequence in which the withdrawal of the seat belt does not follow after the seat has been occupied and/or before the locking of the seat belt buckle, then this is at least one indicator of a false application of the seat belt. It is particularly preferred when it is determined based on these events, which is to say independently of other conditions, whether the seat belt has been applied correctly.

In addition to the chronological order or sequence of predetermined events, it is also advantageous when the respective time intervals are also taken into account. This makes it possible to validate the plausibility of an evaluation event. So for example, a minimum time interval can be specified between the beginning of a seat belt withdrawing operation and the locking of the seat belt buckle so that if it is a shorter time period than the period specified with the limiting value, it can be ruled out independently of later or other measured values already at this point in time that the seat belt assigned to the buckle is inserted into this seat belt buckle. In another embodiment of the present invention it is provided that evaluation device is configured to detect the temporal progression of the tensile force and/or of the tightening force and take it this also into account. In other words, it can be provided that the respective measured values of the tensile force and/or of the tightening force are detected continuously and for example logged in a storage device. It is also possible to perform an evaluation in real time, so that it is not necessary to store all the accumulated raw data. The consideration of the temporal progression advantageously enables a particularly precise classification and characterization of the movements of the seat belt and/or of the relevant operation or utilization thereof by the seat occupants. Furthermore, the consideration of the progression also makes it possible to make or detect a correlation of the forces to other events and/or dynamic variables. It is also advantageous that by taking into account the progression of the forces, improved precision and reliability of the recognition of the application of the seat belt as intended is achieved because unlike with a single point of measurement or measured value, the probability of a coincidental correspondence between two progressions over a period of time is significantly smaller. An attempt at manipulation or circumvention is thus advantageously made considerably more difficult.

It is particularly advantageous when a ring buffer system can be used to record the measured values. The recording or detection of the measured values can be started for example by opening the door of or with an access to the vehicle and/or by activating the ignition and/or by starting the drive motor of the vehicle. The recording or the detection of the measured value can take place or be carried out during a specified time period from the starting of the drive motor of the vehicle. Similarly, it is also possible to carry out the recording or detection of the measured value for example during a respective complete operating cycle of the vehicle. This can comprise one trip of the vehicle and it can for example end when the drive motor is switched off and/or when the ignition and/or the drive motor is turned off, or with the locking of the vehicle. As a result, it can be advantageously possible to reliably monitor during the trip whether the seat belt is permanently applied as intended.

It is particularly preferred in this case when the evaluation device is configured to detect or determine whether the seat belt is applied as intended and secured in the seat belt buckle, and to compare the detected temporal course of the tensile force and/or of the tightening force to a respective predetermined characteristic course. This makes it possible to minimize in an advantageous manner a real-time computational expense required for the determination. It is preferred when several characteristic temporal courses or profiles are determined for different situations and or circumstances by the manufacturer and then stored or preserved in a storage device in a storage device of the vehicle or of the apparatus according to the invention. Also in this case, a threshold or a limiting value for a deviation of the actually determined or measured force profile can be also defined and specified from the respective predetermined characteristic profile. An improper application of the seat belt is thus recognized and/or signaled only when the deviation or the amount of the deviation reaches or exceeds the specified limiting value. This makes it possible to avoid in an advantageous manner erroneous detection of an improper application of the seat belt.

It is particularly preferred when a characteristic profile of the tensile force and/or of the tightening force can be preset for at least one specified driving situation and/or for at least one type of clothing of the seat occupant and/or for at least one body size and/or body circumference of the seat occupant. In particular, it can be also provided that the actual driving situation is taken into account during the recognition. This can for example comprise or relate to a driving direction, a change in the driving direction, a speed, a longitudinal acceleration and/or a transversal acceleration of the vehicle. Similar driving situations or driving maneuvers can have or exert an influence on the measured forces so that taking them into account makes it possible to improve the precision and reliability during the recognition of the proper application of the seat belt.

It is particularly advantageous when the apparatus according to the invention can be active continuously or permanently during the operation of the vehicle and when it can evaluate the determined forces. The result of this may be for example that it is determined only during the trip that the seat belt has not been applied as intended, for example when it can be expected that a certain driving maneuver will exert a characteristic influence on the measured tightening force and/or tensile force, or that it would exert or cause influence in case of a specific purpose, but this influence cannot be determined or obtained from the actual measured values. Also in this case, an attempt at manipulation or circumvention of the detection is rendered more difficult, which in the end further improves the safety of the occupant of the seat.

The vehicle according to the invention comprises at least one apparatus for detection of a proper application of the seat belt, as well as a plurality of seats, to each of which is assigned a seat belt and a seat belt buckle. The evaluation device of the apparatus of the vehicle is in this case configured to determine based on the tensile forces and tightening forces measured for several or for all of the seat belts and seat belt buckles, with respect to several or all seat belt buckles, whether the respective seat belt buckle is applied correctly and as intended and whether it is secured in the seat belt buckle that is assigned to it. It is particularly preferred when the evaluation device is configured to determine a temporal offset of the measured tensile forces and tightening force and/or so that when the respective level of the measured tensile forces and tightening forces or the respective temporal profile of the measured tensile forces and tightening force is detected, to take into account whether the respective seat belt is properly applied and secured in the seat belt buckle that is assigned to it.

Under the term the level of the forces can be understood for example a value or an amount of the forces, but for example also an average value and/or an interval or a range of the values detected between the minimum value and the maximum value. By taking into account an evaluation of such characteristic features, the precision and the reliability of the detection can be advantageously further improved and a circumvention can be rendered more difficult. Since the respective values that are measured for several or for all of the seat belts and seat belt buckles will be evaluated together by an evaluation device, this makes it possible for example to detect or determine when a seat belt is secured or held in another seat belt buckle than the one that is assigned to it. For this detection can be in particular advantageously used and evaluated an adaptation of the chronological sequence, which is particularly useful and which can be used for en evaluation of the respective force profiles and/or of the respective sequence of the events, for example of each withdrawal of the seat belt, or of the respective occupancy of the seat and respective locking of the seat belt buckle. In this manner, particularly detailed instructions, warnings and/or explanations can be provided or offered to the vehicle passengers, for example when a seat belt is inserted into the wrong or unintended seat belt buckle, or for example when two seat belts are crossed or unintentionally inserted the wrong way. Overall, an unambiguous assignment of an inserted seat belt and of a seat belt buckle is thus enabled. This makes it possible for example to detect erroneous use, for instance when the seat belt belonging to the passenger seat is inserted in the seat belt buckle of the driver seat.

According to the method in accordance with the invention for recognizing a proper application of the seat belt in a vehicle, the tensile force is measured by means of a measuring device arranged in a seat belt buckle for measuring the tensile force that is exerted, wherein this measured tensile force is evaluated by means of an evaluation device. In this case, according to the device it is provided that the tightening force that is exerted by a tightening device on the seat belt buckle is measured by means of an evaluation device and the measure tensile force is evaluated. Furthermore, according to the invention it is provided that the tightening force applied to the seat belt is detected by means of the detection device. It is further also provided that the tensile force is compared by means of the evaluation device. Further still, the tensile force evaluated by the evaluation device is compared to the tightening force and a corresponding comparison result is used to determine whether the seat belt is secured in the seat belt buckle correctly, which is to say whether it is applied by the respective user or seat occupant correctly and as intended.

The embodiments described up to this point and respective corresponding advantages of the device according to the invention can be used reciprocally and therefore they can be correspondingly transferred or mutually exchanged in a meaningful manner. This also applies in particular to the components and device that are used to carry out the method according to the invention.

Other advantages, features and details of the invention will become apparent from the following description of preferred embodiments of the invention and from the figures. The features and combinations of features described above as well as the features and feature combinations shown below in the description of the figure and/or shown alone can be used not only in the respective combination, but also in other combinations or alone, without deviating from the scope of the invention.

Figure 1:
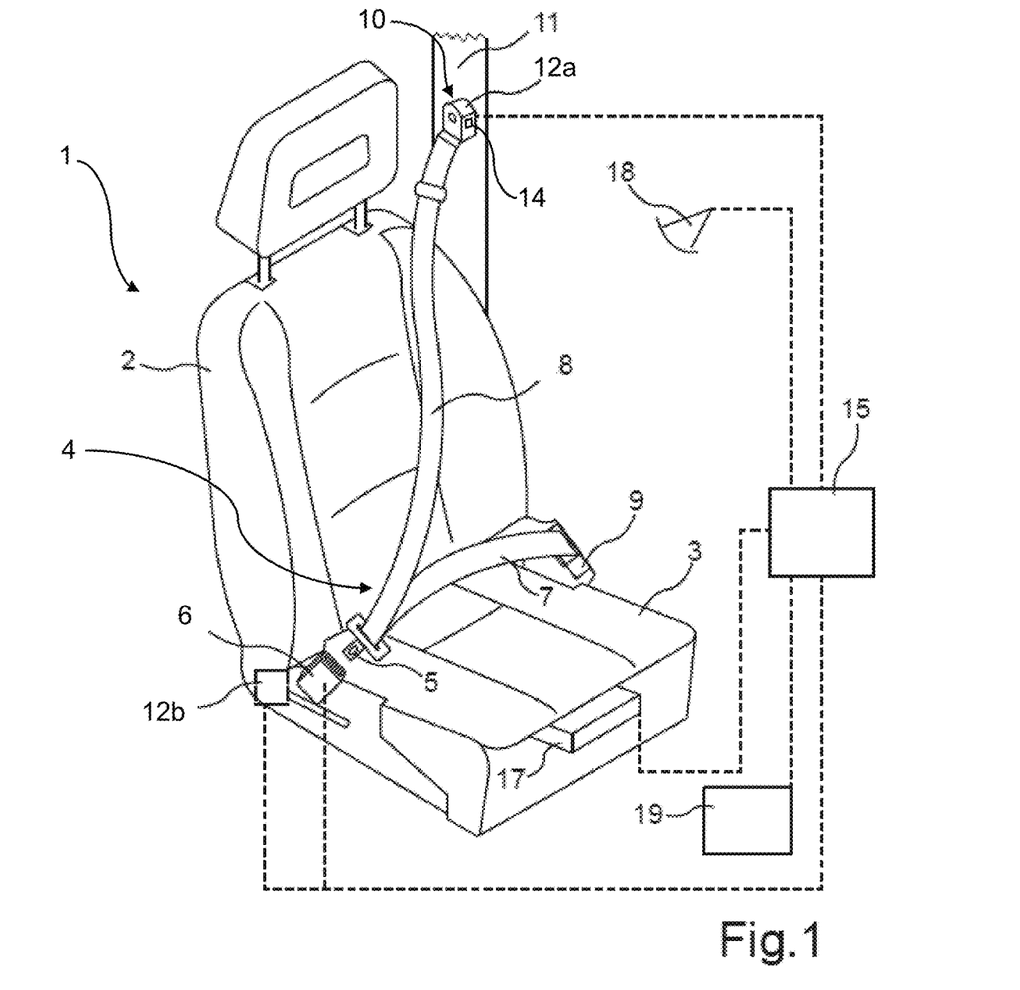
FIG. 1 is a schematic perspective view of a vehicle equipped with an apparatus designed according to an embodiment of the present invention for recognizing the proper application of a seat belt assigned to a vehicle seat.

FIG. 1 shows a schematic perspective view of a vehicle seat which will be hereinafter referred to as seat 1. This seat 1 can be in particular a seat of a vehicle. In the present case, the seat 1 has a backrest part 2 and a cushion part 3 arranged on the seat 1 with, which are associated a seat belt 4 that is provided with a belt tongue 5 as well as with a seat belt buckle 6. This means that the seat belt 4 and the seat belt buckle 6 are provided and arranged in order to keep a seat occupant of the seat 1, not shown here, safely in the seat.

For this purpose, the seat belt tongue 5 is inserted into the seat belt buckle 6, which is provided with a corresponding releasable locking mechanism for securely holding or fixing the seat belt tong 5 and thus also the seat belt 4. The seat belt buckle 6 can be arranged for example on or attached to the seat 1, but it can be, additionally or alternatively, also for example attached to or held by a frame part of the vehicle.

In the present case, the seat belt is provided by way of an example as a three-point belt. Accordingly, a lower seat belt part 7 can span the cushion part 3 and an upper seat belt part 8 can extend diagonally from seat part 2. The lower seat belt receptacle 9 can be in this case arranged for example on the side opposite to the seat belt buckle 6 of the seat 1, in particular with respect to the cushion part 3. The upper seat belt receptacle 10 is here arranged on and/or in a B pillar 11 of the vehicle. At the same time, it is provided that at least the upper seat belt receptacle 10 comprises a tightening device 12a, which is configured to tighten the seat belt 4. In other words, a tightening force can be applied by means of or with the tightening device 12a to the seat belt 4, by means of which the upper seat belt section 8 can be or is pulled in the direction of the upper seat belt receptacle. If the seat belt tongue 5 is locked in the seat belt buckle 6, it can function as a deflection roller so that the lower seat belt section 7 is pulled in the direction of the seat belt tongue 5. This makes it possible to ensure with the tightening device 12a that the seat belt 4 is attached to the seat occupant so that it can fulfill its function in an optimal manner.

Additionally or alternatively to the arranged in or on the upper seat belt receptacle 10, the tightening device 12b can be also arranged on the seat belt buckle 6, or—as indicated here by dotted lines—connected to the seat belt buckle 6. In this case, the seat belt buckle 6 itself can be pulled or moved by means of the tightening device 12b in order to tighten the seat belt 4. Similarly, it is also possible to arrange the tightening device 12b or a component of the tightening device 12b in the seat belt buckle 6. For this purpose, a corresponding actuator system 6a can be arranged in the seat belt buckle 6, so that it then becomes a pulling component.

In any case, a detection device 13 is provided, which is designed to detect the tightening force that is exerted by the tightening device 12a onto the seat belt 4. A precise arrangement of the detection device 13 can in this case depend on the arrangement or on the position of the tightening device 12a. In the present case, the detection device 13 can be arranged for example also in the upper seat belt receptacle 10 or in the B pillar 11. Furthermore, an extraction sensor 14 is in the present case arranged on the upper seat belt receptacle 10, which is configured to determine a withdrawal length of the seat belt 4. The determination of the withdrawal length or the measuring of the seat belt extraction can be carried out for example by means of a potentiometer that is connected directly or indirectly to the seat belt 4. In order to minimize the component expense, it can be for example provided that the tightening device 12a comprises a reversible seat belt tightener (RGS), which is already equipped with a potentiometer. The potentiometer can then be also advantageously used also to determine the extraction length.

The tightening force determined by the detection device 13 as well as the extraction length of the seat belt 4 that is determined by the extraction sensor 14 are transmitted via a corresponding data connection to an evaluation device 15.

In the seat belt buckle 6 is in the present case arranged a measuring device for measuring the tensile force that is exerted on the seat belt buckle. Such a tensile force can be transmitted to or act on, for example when the seat belt tongue 5 is locked in the seat belt buckle 6, via the force that is exerted on the seat belt 5, to the seat belt buckle 6. The measuring device 16 can comprise for example one or several strain gauges for measuring the tensile force. The measured values of the tensile force detected by the measuring device 16 can be also transmitted via a corresponding data connection to the evaluation device 15.

Furthermore, the vehicle may also comprise other sensors or sensor devices, which can transmit in a similar manner their respective measured values, data or information to the evaluation device 15. For example, a seat sensor system 17 can be provided in or on the seat 1, by means of which for example the occupancy or the status of the seat 1 and/or when required also the weight of the seat passenger who is sitting in the or on the seat 1 can be determined. The interior space of the vehicle can be detected—for example optically—by means of an interior space sensor system 18 of the vehicle. For this purpose, the interior space sensor system 18 can be equipped with a camera. By means of a corresponding image processing, or with evaluation of the image data detected with or provided by such a camera, it is possible for example to determine whether the seat 1 is occupied by a person or whether an object is placed on it. If necessary, the size and the body circumference and/or the type of clothing can be also determined. In addition, the evaluation device 15 may for example also transmit data from a vehicle sensor system 19. This data transmitted from the vehicle sensor system 19 can be for example a driving state or a driving situation and/or other parameters of the vehicle.

The evaluation device 15, the seat belt 4 with the tightening device 12*a*, the detection device 13 and the extraction sensor 14 as well as the seat belt buckle 6 with the measuring device 16 form in the present case an apparatus for detecting a proper application of the seat belt 4. In order to enable this detection, the evaluation device 15 is configured to compare the tensile force to the tightening force and to determine based on a corresponding comparison result whether the seat belt 4 has been applied properly and secured in the seat belt buckle 6. A corresponding procedure will now be briefly explained based on FIG. 2 while referring to the components and devices described in the context of FIG. 1.

Figure 2:
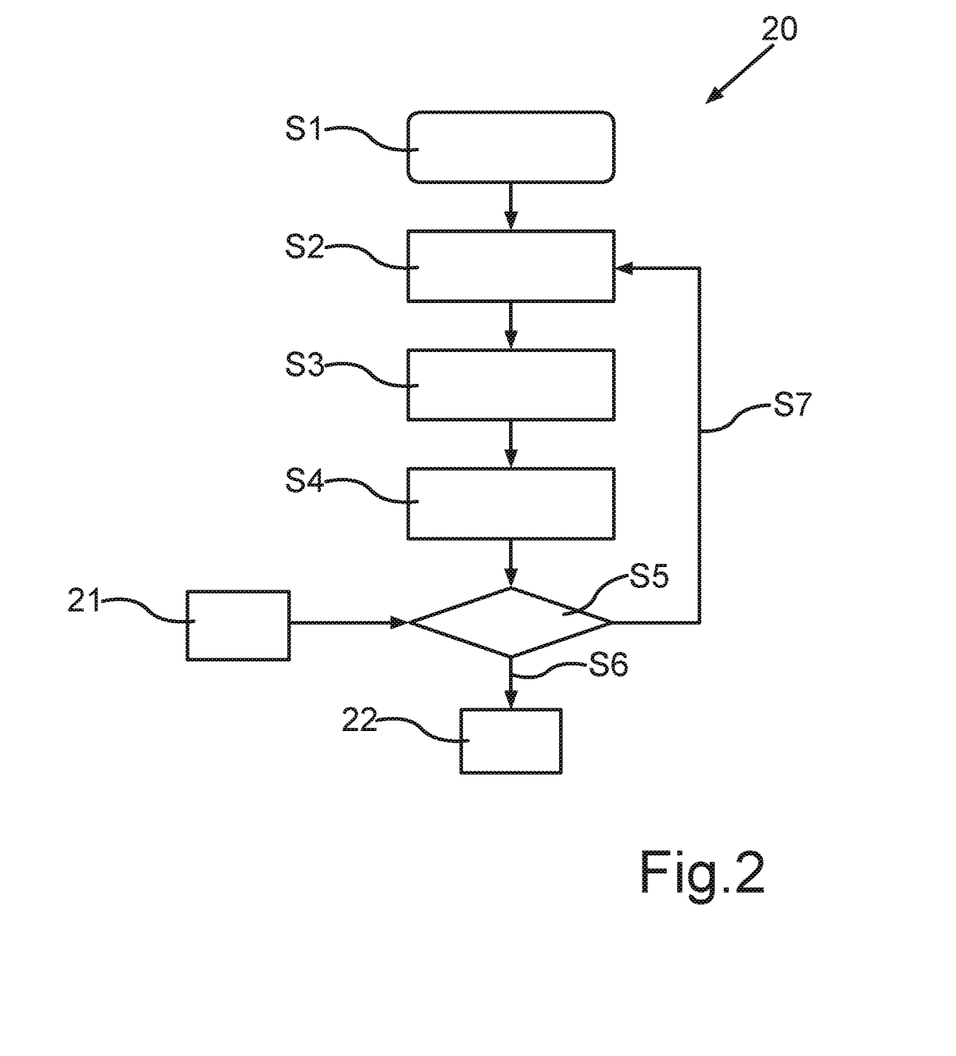
FIG. 2 shows a schematic flow diagram of an embodiment of a method according to this invention.
Figure 3:
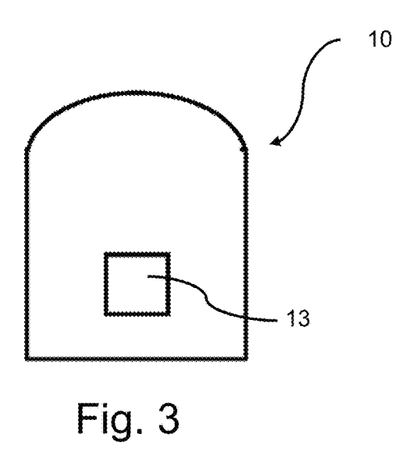
FIG. 3 is a schematic representation of a detection device 13 arranged inside of the upper seat belt receptacle 10 of FIG. 1.
Figure 4:
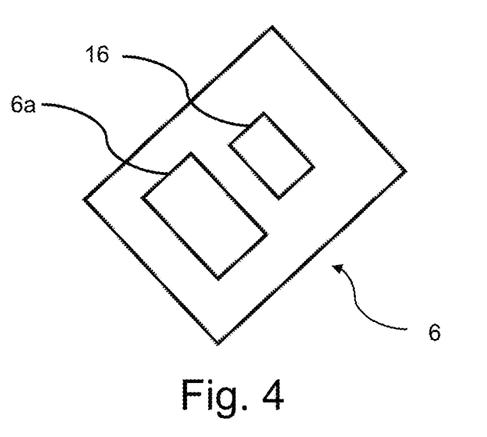
FIG. 4 is a schematic representation of the actuator system 6a and the measuring device 16 arranged in the seat belt buckle 6 of FIG. 1.
Figure 5:
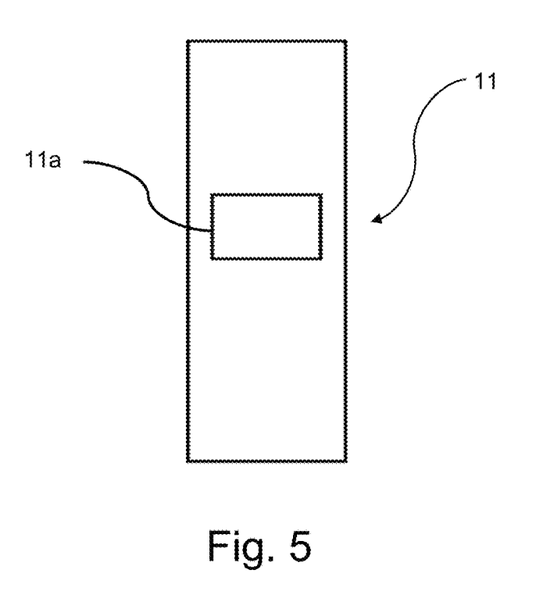
FIG. 5 is a schematic representation of the actuator system 11a inside the B pillar 11 of FIG. 1.

FIG. 2 shows in a flow diagram 20 a schematic example of a method for detecting a proper application of the seat belt 5. It should be explicitly pointed out that the individual steps described here based on the flow diagram 20 can be also carry out in a different sequence, while the intended result can be still achieved.

The procedure is started with a procedural step S1. This start can be triggered or effected for example when the vehicle is unlocked by a user, in particular from outside of the vehicle, or by opening the door of the vehicle, by activating or starting the ignition of the vehicle or the like. It can be for example also provided that the procedure is started as soon as all of the participating or necessary components and devices have been activated or started or impacted with the supplied electric voltage or with operating voltage. At the start of the procedure, detection of events can be also activated so that during the course thereof, predetermined events as well as their temporal sequence are detected and if required also recorded or stored. A corresponding check or evaluation of the detected sequence can start for example with the first detected event, or for example with the first detected event after the unlocking of the vehicle, or with the door of the vehicle, or with the unlocking of the seat belt buckle 6. As events can be detected at least the occupancy of the seat 1, the extraction of the seat belt 4 and the unlocking of the seat belt buckle 6.

In a procedural step S2, for example the occupancy of the seat 1 by the seat occupant can be detected by means of the seat sensor system 17 and/or by the interior space sensor system 18. In this case, the seat occupant's weight, body mass and/or type of clothing can be subsequently also detected. Similarly, for example a position or inclination of the backrest part 2 as well as a position of the seat 1 can be also detected. All of this data and information will be transmitted or provided to the evaluation device 15.

In the present case, the extraction of the seat belt 4 is detected in procedural step S3. At the same time, the force exerted in this case initially at the starting time as well as its temporal progression and the maximum and/or final withdrawal length can be also detected and transmitted to the evaluation device 15. Similarly, the tightening force can be applied by means of the tightening device 12*a* permanently or continuously and a corresponding value can be also detected and transmitted to the evaluation device 15. The final withdrawal length in this case means the withdrawal length that exists after the end of the withdrawing movement and if appropriate, of the opposing withdrawing force caused by the tightening configuration. In a procedural step S4 is in the present case detected a locking or clicking into place of the seat belt buckle. At first it is not necessarily clear or ensured that the belt tongue 5 of the seat belt 4 has been actually inserted into the seat belt buckle 6. The force profile of the tensile force acting on the seat belt buckle 6 is recorded by means of the measuring device 16 and transmitted to the evaluation device 15.

In a procedural step S5, the tightening force and the tensile force and/or their temporal progressions are mutually compared to one another. A corresponding comparison result is then evaluated by the evaluation device 15, for example based on a predetermined characteristic curve and/or based on one or a plurality of predetermined evaluation conditions. At the same time, some or all of the sensor data 21 of the evaluation device 15, for example the data that has been transmitted by the seat sensor system 17, by the internal space sensor system 18 and/or by the vehicle sensor data 19, is taken into account. This can mean that for example based on the sensor data 21, or based on the parameters or parameter values contained in this data or transmitted from this data and obtained from one or several predetermined characteristic curves, one of several characteristic curves are selected and applied for evaluation of each respective current situation. In the same manner, however, a complex, multi-dimensional characteristic curve can be also provided. The sensor data 21 can also comprise data or information from other seats, detection systems, extraction sensors and measuring device, for example about one or several other seats of the vehicle.

If the result of the evaluation is that the seat belt is secured erroneously or improperly and not in accordance with the intended purpose, a warning signal 22 can be provided for the seat occupant immediately, or for example during a subsequently occurring predetermined event, or during and/or for example with the occurrence of a predetermined driving state and/or operating state of the vehicle, in a procedural step S6. For example, it can be provided that the warning signal is only output when a drive motor of the motor vehicle is started or when the motor vehicle is set into motion. Accordingly, as a predetermined state during which the warning signal 22 is output can be defined for example the state of the vehicle when the vehicle is moving. In other words, it can be also provided that the alarm—or instruction—or warning signal 22 is output when the vehicle is set into motion, or when it is moving at a speed that is above a predetermined threshold speed. The latter can advantageously for example allow a free maneuvering of the vehicle that is as free of deflections as much as possible below the predetermined limiting speed, so that the occupant of the seat has the best possible general view or overview of the environment in the vehicle without being restricted by the seat belt 4 in the freedom of movement.

Independently of the result of the evaluation, the evaluation or a corresponding monitoring of a proper application and/or placement of the seat belt 4 is carried out in a procedural step S7 permanently, in regular intervals and/or when predetermined events occur—such as for example when the seat belt buck is unlocked—again or continuously, so that the current data and information that has been collected up to this point can be evaluated or taken into account. This makes it possible to detect or monitor continuously or during the operation of the vehicle whether the seat belt 4 has been applied properly and as intended, wherein the warning signal 22 can be accordingly output also during the driving operation, for example when the seat belt buckle 6 is unlocked.

The invention claimed is:

1. An apparatus for detecting a proper application of a seat belt in a vehicle, comprising:
    a seat belt;
    a seat belt buckle that is assigned to the seat belt and configured for securing the seat belt therein;
    a measuring device arranged in the seat belt buckle for measuring a tensile force exerted upon the seat belt;
    an upper seat belt receptacle out of which the seat belt is pulled;
    a tightening device configured for exerting a tightening force on the belt and comprising an actuator system arranged in the upper seat belt receptacle so that the seat belt is pulled towards the upper seat belt receptacle;
    an extraction sensor for determining a length of an extraction of the seat belt from said upper seat belt receptacle;
    a detecting device configured for detecting the exerted tightening force; and
    an evaluation device configured to compare the measured tensile force to the detected tightening force to obtain a comparison result and configured to determine based on the comparison result whether the seat belt is properly placed and secured in the seat belt buckle, and the evaluation device is configured to determine whether the seat belt is properly placed and secured in the seat belt buckle based on the comparison result and the length of the extraction of the seat belt detected by the extraction sensor.

2. The apparatus according to claim 1, wherein the tightening device includes two actuator systems, one actuator system is said actuator system arranged in the upper seat belt receptacle from which the seat belt can be pulled out for application, and another actuator system is arranged in or on the seat belt buckle.

3. The apparatus according to claim 1, wherein the seat belt is assigned to a seat of the vehicle, and the evaluation device is further configured to determine based on the comparison result whether the seat belt is guided along the seat behind a backrest part of the seat.

4. The apparatus according to claim 1, wherein the seat belt is assigned to a seat and the evaluation device is further configured to determine based on the comparison result whether the seat belt is guided between a respective seat occupant and the seat.

5. The apparatus according to claim 1, wherein the apparatus is designed to make the determination as to whether the seat belt has been placed in the seat belt buckle correctly and secured as intended when the seat belt seat belt buckle is locked and before a start of a trip of the vehicle.

6. The apparatus according to claim 1, wherein the evaluation device is configured to determine whether the seat belt is properly placed and secured in the seat belt buckle based on the comparison result, the length of the extraction of the seat belt detected by the extraction sensor, and at least one item of information selected from the group consisting of:
    a position of the seat to which the seat belt is assigned;
    an inclination of a backrest of a seat to which the seat belt is assigned;
    an occupancy status of at least one seat of the vehicle;
    a weight of a vehicle occupant who is using the seat belt; and
    a body size or a body dimension of a vehicle occupant who is using the seat belt.

7. The apparatus according to claim 1, further comprising at least one sensor system configured for detecting a temporal sequences of a plurality of events, and wherein the evaluation device is configured to determine whether the seat belt is properly placed and secured in the seat belt buckle based on the comparison result, the length of the extraction of the seat belt detected by the extraction sensor, and a temporal sequence of a plurality of events detected by at least one sensor system.

8. The apparatus according to claim 7, wherein the evaluation device is configured to determine whether the seat belt is properly placed and secured in the seat belt buckle based on the comparison result, the length of the extraction of the seat belt detected by the extraction sensor, and the temporal sequence of a plurality of events comprising at least an occupancy of a seat to which the seat belt is assigned, and a withdrawal of the seat belt and locking of the seat belt buckle.

9. The apparatus according to claim 1, wherein the evaluation device is further configured to determine temporal progression of the measured tensile force and of the detected tightening force in a chronological order and configured to determine whether the seat belt is properly placed and secured in the seat belt buckle based the comparison result and the determined temporal progression of the measured tensile force and of the measured tightening force.

10. The apparatus according to claim 9, wherein the evaluation device is configured to determine whether the seat belt is properly placed and secured in the seat belt buckle based on the comparison result and a comparison of the determined temporal progression of the measured tensile force and of the detected tightening force to a respective predetermined characteristic progression.

11. The apparatus according to claim 10, wherein the characteristic progression of the tensile force and of the tightening force is predetermined for:
    at least one driving situation;
    at least one clothing type of a passenger of the vehicle using the seat belt; and
    at least one body size and body circumference of a passenger of the vehicle using the seat belt.

12. A vehicle comprising:
    a plurality of seats, each seat being assigned a respective seat belt and a seat belt buckle, an upper seat belt receptacle out of which the seat belt is pulled, a tightening device configured for tightening the seat belt and comprising an actuator system arranged in the upper seat belt receptacle so that the seat belt is pulled towards the upper seat belt receptacle, an extraction sensor for determining a length of an extraction of the seat belt from said upper seat belt receptacle, a measuring device arranged in the seat belt buckle for measuring tensile force exerted on the seat belt buckle by the seat belt, and a detection device for detecting tightening force exerted on the seat belt, and an evaluation device configured to determine, based on the tensile forces and tightening forces measured for all of the seat belts and seat belt buckles, whether each seat belt has been placed properly and secured as intended in each respective seat belt buckle, and the evaluation device is configured to determine whether each respective seat belt is properly placed and secured in each respective seat belt buckle based on the comparison result and the length of the extraction of each respect seat belt detected by the extraction sensor.

13. The vehicle according to claim 12, wherein the evaluation device is further configured to determine whether each seat belt has been placed properly and secured as intended in each respective seat belt buckle, based on:

a temporal offset of the measured tensile forces and of the tightening forces;

a respective level of the measured tensile forces and of the tensile forces; and a respective temporal progression of the measured tensile forces and of the tightening forces.

14. A method for detecting a proper application of a seat belt in a motor vehicle, comprising:

pulling a seat belt from an upper seat belt receptacle;

inserting the seat belt into a seat belt buckle;

determining a length of extraction of the seat belt from said upper seat belt receptacle;

measuring an exerted tensile force by a measuring device arranged in a seat belt buckle assigned to the seat belt;

detecting a tightening force exerted by a tightening device onto the seat belt by a detection device;

comparing the measured tensile force to the detected tightening force exerted onto the seat belt and the determined length of the extraction of seat belt by an evaluation device; and based on a corresponding comparison result, determining whether the seat belt has been placed properly and secured as intended.

* * * * *